(12) United States Patent
Burgoyne, Jr. et al.

(10) Patent No.: US 7,189,795 B2
(45) Date of Patent: Mar. 13, 2007

(54) POLY(ARYLENE ETHER)S BEARING GRAFTED HYDROXYALKYLS FOR USE IN ELECTRICALLY CONDUCTIVE ADHESIVES

(76) Inventors: William Franklin Burgoyne, Jr., 2610 SW. Arch St., Allentown, PA (US) 18103; Ching-Ping Wong, 3422 Glen Devon La., Duluth, GA (US) 30096; Silvia Liong, 871 Ashland Ave., Atlanta, GA (US) 30307

( * ) Notice: Subject to any disclaimer, the term of this patent is extended or adjusted under 35 U.S.C. 154(b) by 15 days.

(21) Appl. No.: 10/621,022

(22) Filed: Jul. 16, 2003

(65) Prior Publication Data

US 2005/0014921 A1     Jan. 20, 2005

(51) Int. Cl.
*C08G 65/48* (2006.01)
(52) U.S. Cl. .................... 528/86; 528/488; 528/491; 528/493; 525/390; 525/534; 525/70; 428/457; 428/458; 428/620; 428/626
(58) Field of Classification Search .............. 528/86, 528/488, 491, 493; 525/390, 534, 70; 428/457, 428/458, 620, 626
See application file for complete search history.

(56) References Cited

U.S. PATENT DOCUMENTS 6,060,170 A * 5/2000 Burgoyne, Jr. .............. 428/457

OTHER PUBLICATIONS

J. H. Lau, "A Brief Introduction Flip Chip Technologies for Multichip Module Applications," *Flip Chip Technologies*, Mc-Graw Hill, New York (1995).

R. Tummala, "Microelectronics Packaging—An Overview," *Microelectronics Handbook, Part I*, Ed. International Thompson Publishing, 2nd Edition, New York (1997).

K. Gilleo, "Introduction to Conductive Adhesive Joining Technology," *Conductive Adhesives for Electronics Packaging*, Electrochemical Publications, British Isles (1999).

R. Ghaffarian, "Close the Information Gap on IC-Package Reliability," *Electronic Design*, vol. 46, No. 18, pp. 71-72 (Aug. 3, 1998).

J. Ivan, et al., "Moisture and Thermal Degradation of Cyanate-Ester-Based Die Attach Material," *Proceedings of the 1997 Electronic Components and Technology Conference*, 1997, pp. 525-535.

I. Y. Chien, et al., "Low Stress Polymer Die Attach Adhesives for Plastic Packages," *Proceedings of the 1994 Electronic Components and Technology Conference*, 1994, pp. 580-584.

D. P. Galloway, et al., "Reliability of Novel Die Attach Adhesives for Snap Curing," *Proceedings of the IEEE/CPMT International Electronic Manufacturing Technology (IEMT) Symposium*, 1995, pp. 141-147.

(Continued)

*Primary Examiner*—Duc Truong
(74) *Attorney, Agent, or Firm*—Anne B. Kiernan; Michael K. Boyer

(57) ABSTRACT

A poly(arylene ether) polymer includes polymer repeat units of the following structure:

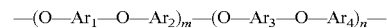

where $Ar_1$, $Ar_2$, $Ar_3$, and $Ar_4$ are identical or different aryl radicals, m is 0.05 to 0.95, n is 1-m, and at least one of the aryl radicals is grafted to at least one hydroxyalkyl group, such as 2-undecanol. The polymer is especially useful in electrically conductive adhesives.

29 Claims, 4 Drawing Sheets

OTHER PUBLICATIONS

A. Javidinejad, et al., "Application of Electrically Conductive Thermoplastic Adhesive Film for Design and Manufacturing of Smart Structures," *SPIE Proceedings Smart Structures and Integrated Systems*, vol. 3668, Mar. 1999, pp. 688-695.

D. Lu, et al., "Conductive Adhesives Based on Anhydride-Cured Epoxy Systems," *Proceedings of the 2nd International IEEE Symposium on Polymeric Electronics Packaging*, 1999.

K. Gilleo, "Assembly With Conductive Adhesives," *Soldering and Surface Mount Technology*, No. 19, Feb. 1995, pp. 12-17.

P. G. Harris, "Conductive Adhesives: A Critical Review of Progress to Date," *Soldering and Surface Mount Technology*, No. 20, May 1995, pp. 19-21.

J. C. Jagt, et al., Electrically Conductive Adhesives: A Prospective Alternative for SMD Soldering?, *IEEE Transactions on Components, Packaging and Manufacturing Technology—Part B Advanced Packaging*, vol. 18, No. 2, pp. 292-297 (May 1995).

J. Jagt, "Reliability of Electrically Conductive Adhesive Joints for Surface Mount Applications," *IEEE Transactions on Components, Packaging and Manufacturing Technology—Part A*, vol. 21, No. 2, pp. 215-225 (Jun. 1998).

* cited by examiner

Bulk Resistivity vs. Plasticizer Concentration

POLY(ARYLENE ETHER)S BEARING GRAFTED HYDROXYALKYLS FOR USE IN ELECTRICALLY CONDUCTIVE ADHESIVES

BACKGROUND OF THE INVENTION

This invention relates to poly(arylene ether) polymers bearing grafted hydroxyalkyl group(s), compositions containing them, and to the use of such polymers and compositions in adhesives, sealants, coatings, and particularly electrically conductive adhesives.

Electronic packaging is an essential part of making technologies available to the everyday consumer. Although a lot of rapid advancements have been made to make integrated circuits (IC) chips smaller and faster, improvements must also be made to package the chips.

There are four main functions to electronic packaging. See, e.g., J. H. Lau, "A Brief Introduction Flip Chip Technologies for Multichip Module Applications," *Flip Chip Technologies*, J. H. Lau (Ed.), McGraw-Hill, N.Y., 1995. The first is to provide a path for electrical currents that provide power to the circuits on the chip. The second function is to distribute signals to and from the IC chip. The third is to remove heat generated by the circuit. The last function is to support and protect the chip from unfavorable conditions, such as extreme temperatures and wear.

There are four different levels of electronic packaging. See, e.g., R. Tummala, "Microelectronics Packaging—an Overview," *Microelectronics Handbook, Part 1*, (R. Tummala et al., Eds.), Ed. International Thompson Publishing, 2nd Edition, New York, 1997. The zero level is connections on the chip level, or wafer level. The first level is the connection from the chip to a single or multi chip module. The second level is the connection from the first level module to printed circuit boards. Finally, the third level is the connection to a motherboard.

In the first and second levels of electronic packaging, tin/lead solder is one of the important materials for making interconnection. Its process parameters are well established in the industry and its cost is relatively inexpensive. Electronic packages that use tin/lead eutectic solder have very reliable thermal, electrical, and mechanical performance.

Despite the advantages of tin/lead solder, there are two factors that have prompted the research for alternative interconnect materials. The first factor is the increasing demands to increase the I/O density in electronic packages, which result in smaller feature sizes and smaller products. The second factor is the desire to ban or reduce lead usage in industrial manufacturing processes and products.

There are two main lead-free alternatives to tin/lead eutectic solder for interconnect material. The first is lead-free solder and the second is electrically conductive adhesive (ECA). Lead-free solder is considered a short term replacement for eutectic solder, since the technology capability of that category of material also is limited by the solder stencil printing process. ECA is a composite of polymer filled with conductive particles, and it is considered a long-term replacement for tin-lead solder.

There are two types of ECAs: isotropic conductive adhesive (ICA) and anisotropic conductive adhesive/film (ACA/ACF). See, e.g., K. Gilleo, "Introduction to Conductive Adhesive Joining Technology," *Conductive Adhesives for Electronics Packaging*, J. Liu (Ed.), Electrochemical Publications, British Isles, 1999. ICA has conductivity in all directions, and is also often called "polymer solder." ACA/ACF systems only have conductivity in one direction. Generally, ICAs have higher conductivity than ACA/ACF, so ICAs have generally been considered to be the more promising replacements for tin/lead solder in high performance applications. R. Ghaffarian, "Close the Information Gap on IC-Package Reliability," *Electronic Design*, vol. 46, no.18, pp. 71–72, Aug. 3, 1998.

The adhesive generally selected for ICA is thermosetting epoxy resin because of its excellent adhesion properties, and because it is relatively stable up to 200° C. Id. Thermoplastics are used in ICAs, but they are mostly applied in die attach, where the important functionality is thermal conductivity. See, e.g., J. Ivan et al., "Moisture and Thermal Degradation of Cyanate-Ester-Based Die Attach Material," *Proceedings of the 1997 Electronic Components and Technology Conference*, 1997, pp. 525–535; I. Y. Chien et al., "Low Stress Polymer Die Attach Adhesives for Plastic Packages," *Proceedings of the 1994 Electronic Components and Technology Conference*, 1994, pp. 580–584; D. P. Galloway et al., "Reliability of Novel Die Attach Adhesives for Snap Curing," *Proceedings of the IEEE/CPMT International Electronic Manufacturing Technology (IEMT) Symposium*, 1995, pp. 141–147; and A. Javidinejad et al., "Application of Electrically Conductive Thermoplastic Adhesive Film for Design and Manufacturing of Smart Structures," *SPIE Proceedings Smart Structures and Integrated Systems*, Vol. 3668, March 1999, pp. 688–695. As for the conductive fillers, silver flakes are used because its resistivity is very low and its oxide is conductive. See, e.g., D. Lu et al., "Conductive Adhesives Based on Anhydride-Cured Epoxy Systems," *Proceedings of the 2nd International IEEE Symposium on Polymeric Electronics Packaging*, 1999. The concentration of conductive fillers in ICA formulation is just beyond the percolation critical volume fraction, between 25 to 30 vol. %. See, e.g., K. Gilleo, "Assembly with Conductive Adhesives," *Soldering and Surface Mount Technology*, No. 19, February 1995, pp. 12–17; and P. G. Hariss, "Conductive Adhesives: A Critical Review of Progress to Date," *Soldering and Surface Mount Technology*, No. 20, May 1995, pp. 19–21.

Although ICAs are not as well established as tin/lead solder as interconnect material, this technology has a lot of advantages over solder (lead and lead-free). The major advantages include the absence of lead, fine pitch capability, reduction in the number of processing steps, low process temperature, and no soldermask requirements. J. C. Jagt et al., "Electrically Conductive Adhesives: A Prospective Alternative for SMD Soldering?" *IEEE Transactions on Components, Packaging, and Manufacturing Technology—Part B Advanced Packaging*, Vol. 18, no. 2, pp. 292–297, May 1995.

The main drawbacks of ICAs are low conductivity, unstable contact resistance, poor impact performance, and lack of reworkability. See, e.g., J. Jagt, "Reliability of Electrically Conductive Adhesive Joints for Surface Mount Applications," *IEEE Transactions on Components, Packaging, and Manufacturing Technology—Part A*, Vol. 21, No. 2, pp. 215–225, June 1998.

Accordingly, it is desired to provide ICAs with acceptable conductivity, stable contact resistance, good impact performance and/or acceptable reworkability.

All references cited herein are incorporated herein by reference in their entireties.

BRIEF SUMMARY OF THE INVENTION

Accordingly, the invention provides a poly(arylene ether) polymer including polymer repeat units of the following structure:

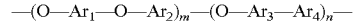

—(O—Ar$_1$—O—Ar$_2$)$_m$—(O—Ar$_3$—Ar$_4$)$_n$— where Ar$_1$, Ar$_2$, Ar$_3$, and Ar$_4$ are identical or different aryl radicals, m is 0.05 to 0.95, n is 1-m, and at least one of the aryl radicals is grafted to at least one hydroxyalkyl group.

Also provided is a composition comprising the polymer.

Further provided is a method for coating, sealing or adhering substrates with the polymer or the composition comprising the polymer.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
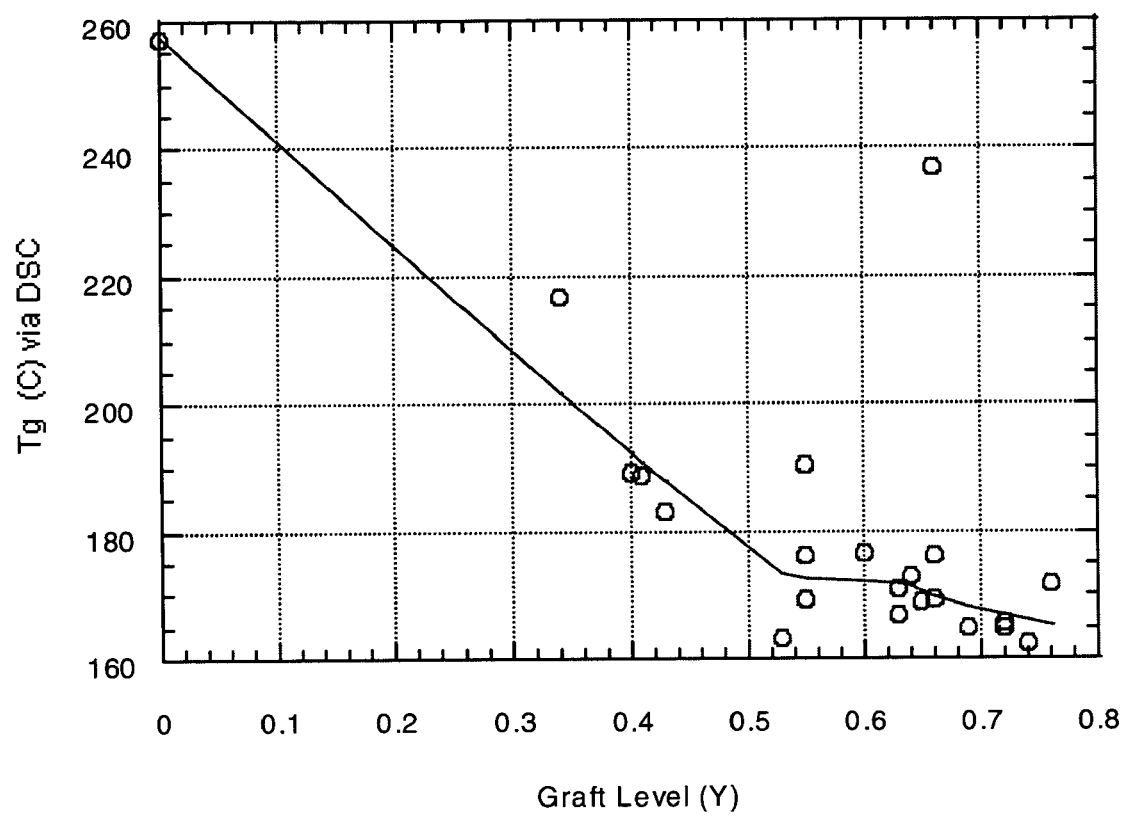
FIG. 1 is a plot of Tg (° C.) vs. Graft Level (Y)

The aforementioned drawbacks of the prior art are overcome by grafting hydroxyalkyl groups onto poly(arylene ether) polymers. The invention thus relates to specific poly (arylene ether) polymers and compositions containing them, their use as adhesives, sealants, dielectrics, passivation layers, coatings or in photo-imaging, a microelectronic device comprising the same, a method of crosslinking the polymers, and an adhesive comprising such poly(arylene ether) polymers, optionally in combination with additional ingredients.

Polymers of the invention comprise polymer repeat units represented by the following structure:

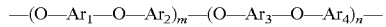

where $Ar_1$, $Ar_2$, $Ar_3$, and $Ar_4$ are identical or different aryl radicals, m is 0.05 to 0.95, n is 1-m, and at least one of the aryl radicals is grafted to at least one hydroxyalkyl group (G). In certain embodiments, each of the aryl radicals of the polymer repeat units is grafted to two hydroxyalkyl groups G, as shown in the following structure:

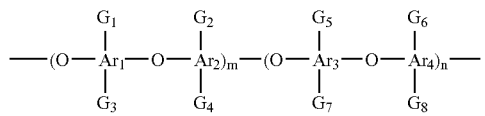

where $G_1$, $G_2$, $G_3$, $G_4$, $G_5$, $G_6$, $G_7$ and $G_8$ are identical or different hydroxyalkyl groups.

Polymers of the invention do not necessarily consist only of these polymer repeat units (i.e., G-containing polymer repeat units). In addition to embodiments wherein the polymer is built solely from the G-containing polymer repeat units, the invention also encompasses polymers comprising other polymer repeat units in addition to the G-containing polymer repeat units, such as, e.g., poly(arylene ether) polymer repeat units lacking any hydroxyalkyl grafts (i.e., G-free polymer repeat units). The sequence in which different polymer repeat units can be combined to form the polymer of the invention is not particularly limited. Thus, polymers of the invention can be, e.g., random, alternating, or block copolymers of the different polymer repeat units.

The average number of hydroxyalkyl groups G per polymer repeat unit is preferably 0.01 to 8.0, more preferably 0.1 to 4.0, even more preferably 0.25 to 1. This average is calculated as the total number of hydroxyalkyl groups per polymer divided by the total number of polymer repeat units per polymer.

As used herein, the term "hydroxyalkyl" refers to a group formed by removal of a single hydrogen from an alkane (branched or straight-chain) containing at least one hydroxyl group. Preferably, there is only one hydroxyl group. Preferred hydroxyalkyl groups of the invention include (wherein the squiggled line represents the aryl radicals to which the groups are attached):

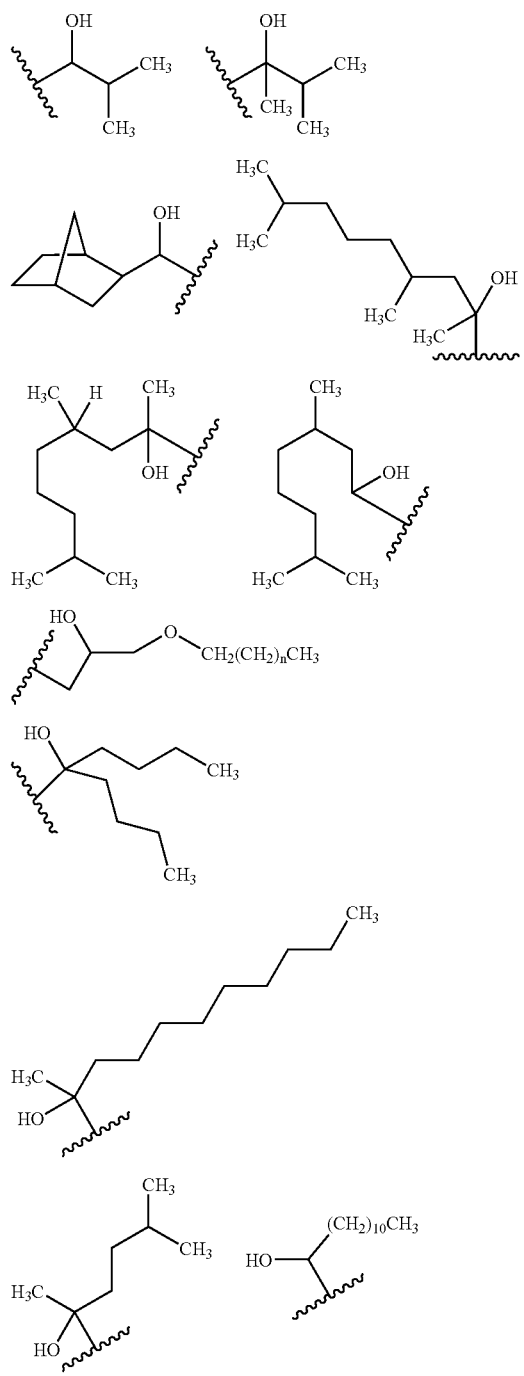

-continued

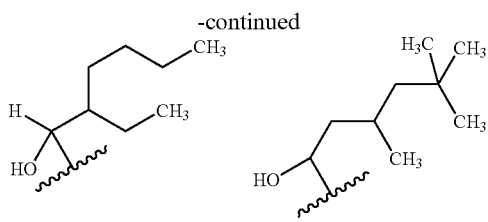

The most preferred hydroxyalkyl group of the invention is formed by grafting 2-undecanone to at least one of the aryl radicals.

Preferably, the aryl radicals $Ar_1$, $Ar_2$, $Ar_3$, and $Ar_4$ are independently selected from the group consisting of:

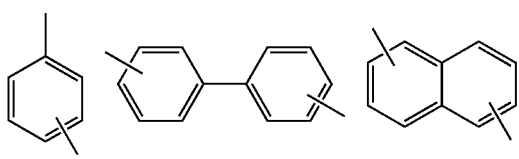

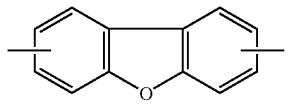

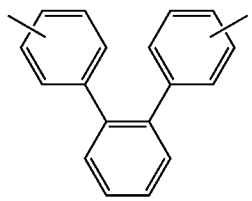

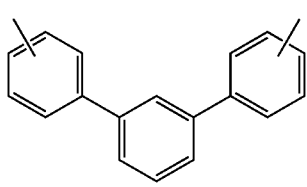

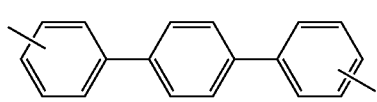

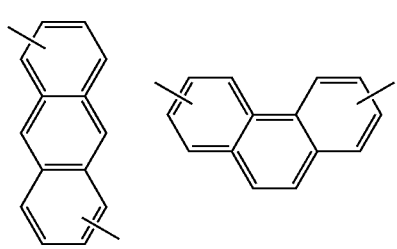

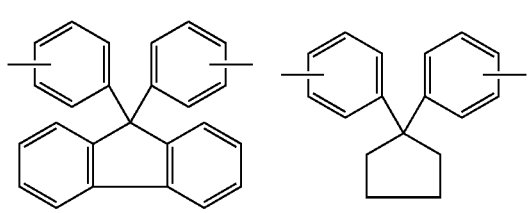

-continued

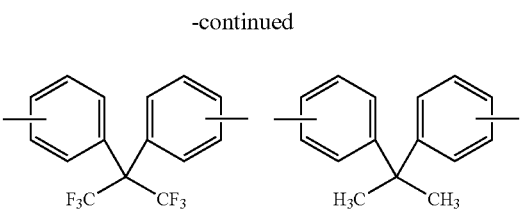

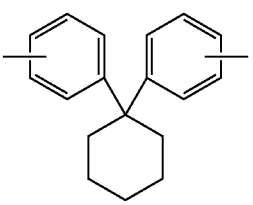

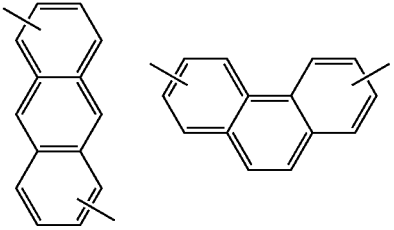

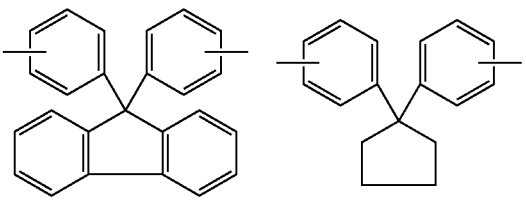

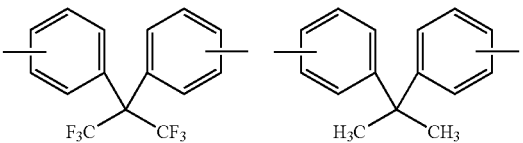

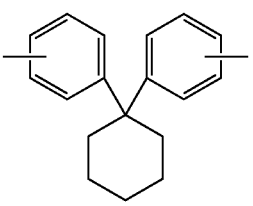

More preferably at least one of aryl radicals $Ar_1$, $Ar_2$, $Ar_3$ and $Ar_4$ is (and still more preferably, each of $Ar_1$ and $Ar_3$ is independently) 9,9-bis(4-hydroxyphenyl)-fluorene, 2,2-diphenylhexafluoropropane or 2,2-diphenylpropane.

Preferred examples of arylene ether radicals having hydrocarbon group(s) grafted thereto include:

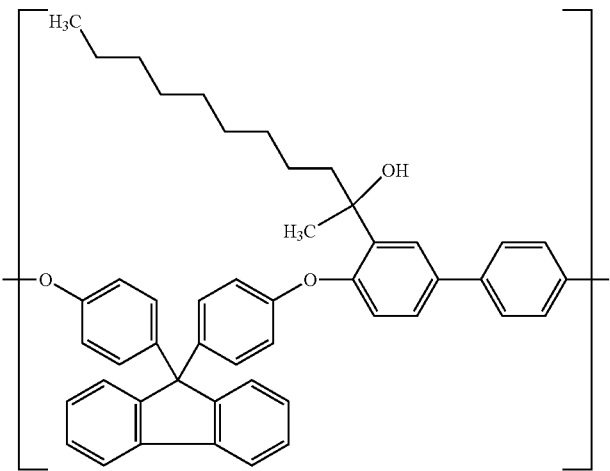
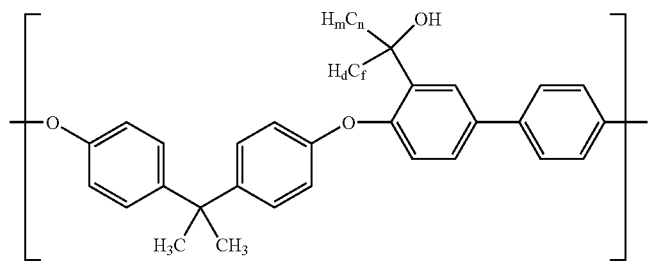
Where d, f m, and n are integers and
m = 4n + 1 and d = 4f + 1
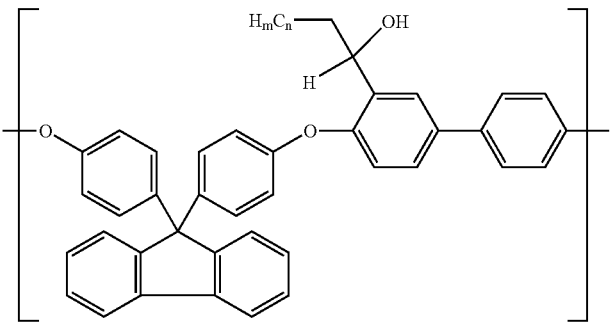
Where m and n are integers and
m = 4n + 1
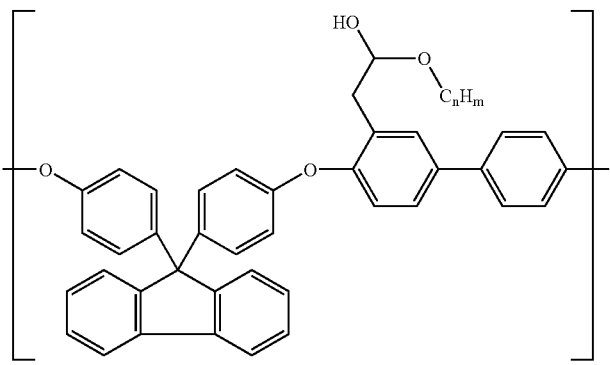
Where m and n are integers and
m = 4n + 1

-continued

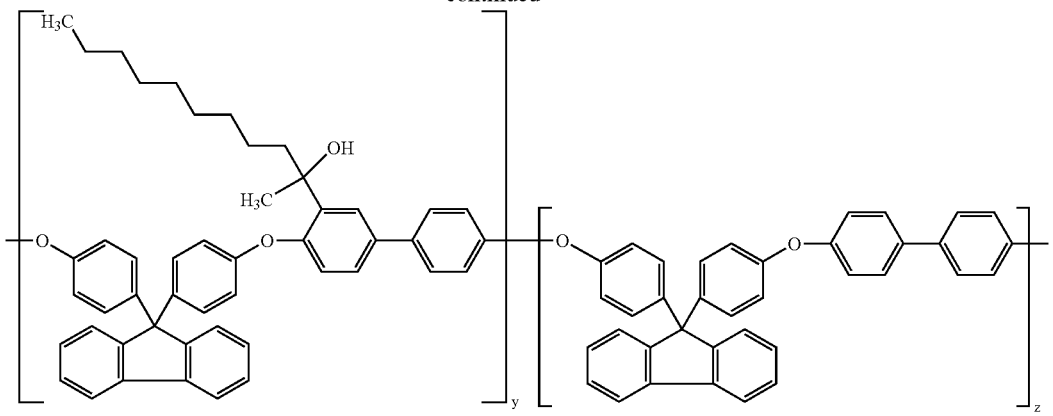

where y + z = 1 and y > 0.01.

Although the foregoing preferred structures contain hydroxyalkyl grafts ortho to the ester linkage, the invention is not limited thereto. Grafts ortho to the ester linkage are preferred, but meta and para grafts are also within the scope of the invention.

The invention also encompasses compositions (cured and uncured) comprising at least one polymer of the invention. The compositions, like the polymers themselves, are useful as adhesives, sealants, dielectrics, passivation layers, coatings or in photoimaging. In addition to the at least one polymer, the compositions can further contain additional ingredients, including but not limited to, a diluent, a reactive solvent, a plasticizer, electrically conductive particles (e.g., metals, metal alloys and/or metal-coated polymers, wherein the metal is copper, silver, nickel, gold, tin-bismuth or blends thereof), an adhesion promoter (e.g., coupling agents, such as silane-based compounds, zirconate-based compounds or titanate-based compounds), a chelating agent, an epoxy resin system (e.g., epoxy, hardener and catalyst) and/or an inorganic filler.

Solvents can be incorporated into the composition, but do not afford a functional group or interfere with the mechanical or electrical properties of the composition. Hence, preferred solvents allow for an adhesive that can be applied as a paste and can reduce the cost of the overall adhesive system. Non-limiting examples of suitable solvents include cyclopentanone, cyclohexanone, tetrahydrofuran, ethyl acetate, dipropylene glycol methyl ether, di(ethylene glycol) ethyl ether acetate, alpha-terpineol, N-methyl pyrrollidinone (NMP), N,N-dimethylacetamide (DMAc), chlorobenzene, methylene chloride, glyme, ethyl ether, butyl ethyl ether, tert-butyl methyl ether, 2-methoxyethyl ether, and di(ethylene glycol)diethyl ether.

Polymers of the invention can be provided by modifying the poly(arylene ether) grafting process described in U.S. Pat. No. 6,060,170 (issued to William F. Burgoyne, one of the present inventors) to graft to the poly(arylene ether) backbone hydroxyalkyl groups G, rather than the specified aromatic groups of the '170 patent. Thus, polymers of the invention are produced by a process comprising direct lithiation of the aryl ether (preferably with tert butyllithium) followed by addition of an electrophile. Generally, an acid is added at the end of the reaction to neutralize any residual lithium salts. The grafting process is preferably conducted in a solvent selected from the group consisting of tetrahydrofuran, glyme, ethyl ether, butyl ethyl ether, tert-butyl methyl ether, 2-methoxyethyl ether, di(ethylene glycol)diethyl ether and mixtures thereof.

A variety of electrophiles can be used to form the hydroxyalkyl group. Preferred electrophiles include aliphatic aldehydes, aliphatic ketones and aliphatic glycidyl ethers.

The resulting polymers possess such desirable properties as a Tg of at least 120° C., preferably a Tg from 160 to 240° C., good conductivity when blended with conductive particles, stable contact resistance, good impact performance and/or acceptable reworkability. Consequently, the polymers and polymer-containing compositions of the invention are particularly suitable for use as an electrically conductive adhesive, such as an ICA and/or an ACA/ACF. The invention therefore further encompasses such adhesives and methods for applying them to substrates.

In addition the invention relates to any microelectronic device comprising the polymer or polymer-containing composition as defined above. Preferably, the microelectronic device contains the polymer as an electrically conductive adhesive, a coating or a sealant.

The invention will be illustrated in more detail with reference to the following Examples but it should be understood that the present invention is not deemed to be limited thereto.

EXAMPLE 1

Preparation of PAE-2 with Grafted 2-Undecanone

PAE-2 is grafted with an alkyl group by adding 2-undecanone as the electrophile in accordance with the following equation:

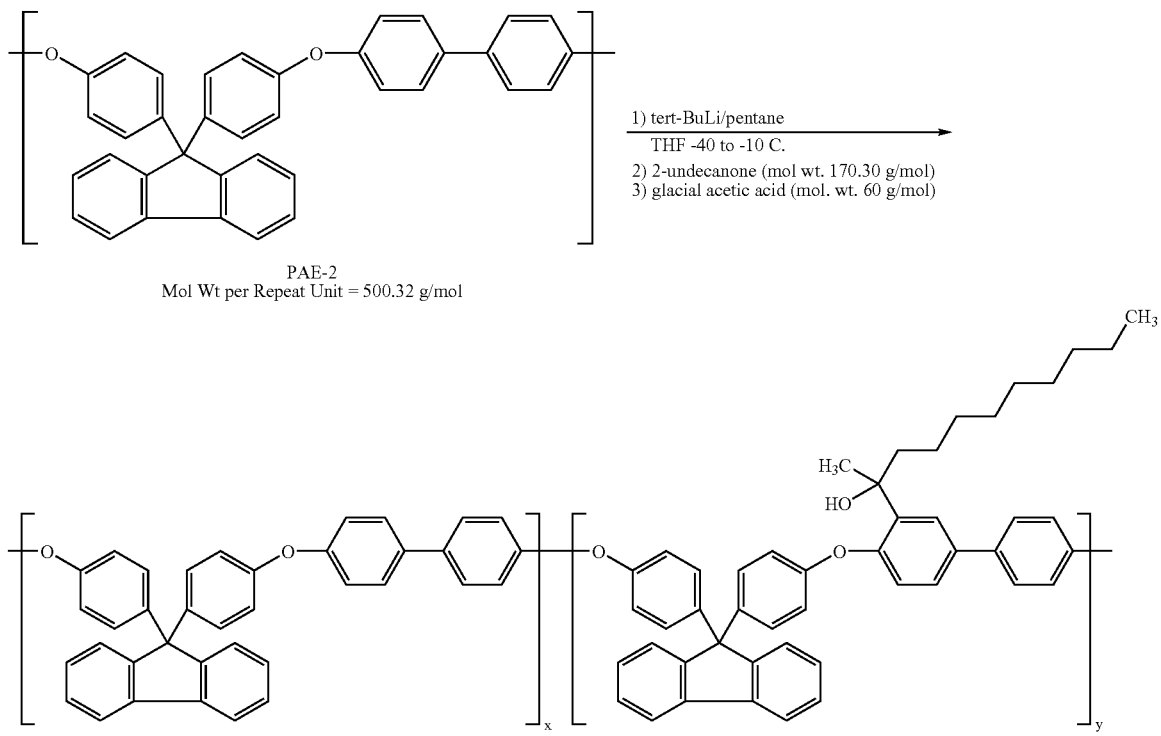

PAE-2
Mol Wt per Repeat Unit = 500.32 g/mol

Procedure

Prior to conducting the grafting reaction with PAE-2, the PAE-2 is dissolved in THF and then precipitated in methanol. Afterwards, the cleaned-up PAE-2 is dried in a vacuum oven (ca.120° C.) overnight in order to remove residual solvent.

Glassware used for the grafting reaction is pre-baked in a 140° C. oven and assembled while hot, which includes charging the reaction vessel with hot PAE-2.

In a 1 L, three-necked, round-bottomed flask, 25.00 g of PAE-2 (0.50 mol of polymer repeat unit) are dissolved in 400 mL of dry THF with mechanical stirring and under a nitrogen blanket. The solution is then cooled to −40° C. with the aid of a dry ice/acetone (or methanol) bath. With mechanical stirring, 25 mL of tert-butyllithium (1.7 M in pentane, 0.0425 mol) are added to the polymer solution over 10–15 min. After addition, the cooling bath is removed and the solution is allowed to gradually warm to −10° C. with continued stirring. An 8.515 g portion of 2-undecanone (0.050 mol) dissolved in 30 mL of tetrahydrofuran is then added slowly via syringe over 5–10 min. with mechanical stirring. The mixture is then allowed to warm to room temperature with continued stirring.

After a minimum of 17 hr, a 10.00 g portion of glacial acetic acid (0.17 mol) is then added to the reaction mixture with continued mechanical stirring. After 3 hr, the reaction mixture is then poured into 2 L of methanol contained in a blender. The precipitated polymer is isolated via vacuum filtration and air dried overnight. The polymer is then dissolved in 500 mL of THF, the solution is filtered through Whatman #1 filter paper, and then the polymer solution is poured into 2 L of methanol contained in a blender.

The precipitated polymer is then collected via vacuum filtration and air dried as before. The polymer is then dried in a vacuum oven at 120° C. overnight. The weight of the dried polymer is determined. 25.75 g of dried polymer were obtained. The properties of the product included: NMR analysis, y value=0.498; Molecular Weight (via GPC analysis tetrahydrofuran solvent; against polystyrene standards), Mw=34,182; Mn=11,894; polydispersity=2,874; and Tg (via DSC)=173° C.

EXAMPLES 2–21

The procedure used in Example 1 was used except that the amount of reagents used is varied according to Table 1. Correlation of graft level and Tg via DSC, second heating data, is presented in FIG. 1.

TABLE 1

Preparations of 2-undecanone grafted PAE-2

| Example No. | PAE-2 (g) | t-BuLi (mL), [mol.] | 2-undecanone (g) [mol.] | THF (mL) | Graft level (y) | Tg(° C.) via DSC after 2nd heating | Mn | Poly-dispersity (Mw/Mn) | Isolated product (g) |
|---|---|---|---|---|---|---|---|---|---|
| 2 | 25 | 41 [0.0697] | 12.77 [0.075] | 615.0 | 0.43 | 182.94 | 37,251 12,453 | 2.99 | 21 |

TABLE 1-continued

Preparations of 2-undecanone grafted PAE-2

| Example No. | PAE-2 (g) | t-BuLi (mL), [mol.] | 2-undecanone (g) [mol.] | THF (mL) | Graft level (y) | Tg(° C.) via DSC after 2nd heating | Mn | | Poly-dispersity (Mw/Mn) | Isolated product (g) |
|---|---|---|---|---|---|---|---|---|---|---|
| 3 | 25 | 50 [0.085] | 15.00 [0.088] | 615.0 | 0.6 | 176.8 | 47,961 | 14,086 | 3.41 | 20 |
| 4 | 25 | 41 [0.0697] | 12.77 [0.075] | 615.0 | 0.63 | 170.88 | 36,769 | 12,262 | 2.999 | 25 |
| 5 | 25 | 41 [0.0697] | 12.77 [0.075] | 615.0 | 0.63 | 166.79 | 43,946 | 14,136 | 3.11 | 20 |
| 6 | 25 | 50 [0.085] | 15.33 [0.090] | 615.0 | 0.69 | 164.95 | 35,963 | 13,432 | 2.677 | 27 |
| 7 | 26.62 | 57 [0.0969] | 15.33 [0.090] | 900.0 | 0.66 | 237.02 | 193,700 | 279,000 | 14.5 | 25 |
| 8 | 25 | 41 [0.0697] | 12.77 [0.075] | 615.0 | 0.66 | 176.12 | 37,674 | 13156 | 2.86 | 25 |
| 9 | 25 | 46 [0.0782] | 14.89 [0.087] | 615.0 | 0.72 | 164.97 | 41,646 | 13847 | 3 | 8 |
| 10 | 25 | 46 [0.0782] | 14.89 [0.087] | 615.0 | 0.72 | 165.65 | 26,418 | 12179 | 2.17 | 25 |
| 11 | 25 | 50 [0.085] | 15.00 [0.088] | 615.0 | 0.74 | 162.46 | 26,902 | 11842 | 2.27 | 20 |
| 12 | 25 | 40 [0.068] | 12.77 [0.075] | 612.0 | 0.76 | 171.9 | 27,600 | 8,600 | 3.2 | 27 |
| 13 | 25 | 50 [0.085] | 14.50 [0.085] | 615.0 | 0.66 | 169.52 | 26,582 | 12158 | 2.19 | 20 |
| 14 | 25 | 50 [0.085] | 15.00 [0.088] | 615.0 | 0.65 | 169.06 | 25,927 | 11671 | 2.221 | 15 |
| 15 | 25 | 60 [0.102] | 20.00 [0.117] | 620.0 | 0.41 | 188.86 | 25,405 | 10,863 | 2.339 | 15 |
| 16 | 25 | 75 [0.1275] | 20.00 [0.117] | 625.0 | 0.4 | 189.09 | 25,274 | 11732 | 2.154 | 20 |
| 17 | 25 | 75 [0.1275] | 20.00 [0.117] | 625.0 | 0.53 | 163.37 | 24,564 | 11526 | 2.131 | 20 |
| 18 | 25 | 75 [0.1275] | 20.00 [0.117] | 625.0 | 0.35 | 166.33 | 21,844 | 10731 | 2.036 | 20 |
| 19 | 25 | 50 [0.085] | 14.50 [0.085] | 615.0 | 0.64 | 172.93 | 26,912 | 12163 | 2.212 | 25 |
| 20 | 25 | 50 [0.085] | 15.00 [0.088] | 615.0 | 0.55 | 176.12 | 25,386 | 11788 | 2.153 | 20 |
| 21 | 25 | 40 [0.068] | 12.77 [0.075] | 615.0 | 0.55 | 169.52 | 22,964 | 10,691 | 2.148 | 20 |

EXAMPLE 22

Preparation of PAE-2 Grafted with Dodecyl/Tetradecyl Glycidyl Ether

PAE-2 is grafted with dodecyl/tetradecyl glycidyl ether in accordance with the following equation:

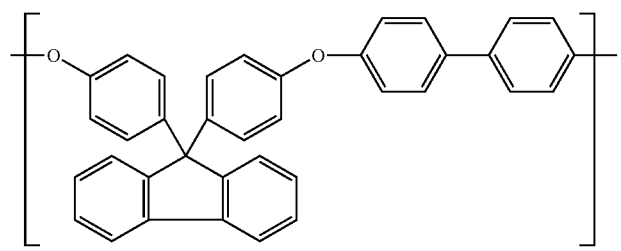
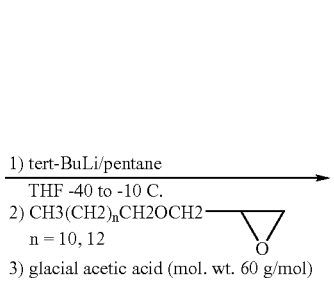

PAE-2
Mol Wt per Repeat Unit = 500.32 g/mol 1) tert-BuLi/pentane THF -40 to -10 C.
2) CH3(CH2)nCH2OCH2— n = 10, 12
3) glacial acetic acid (mol. wt. 60 g/mol)

-continued

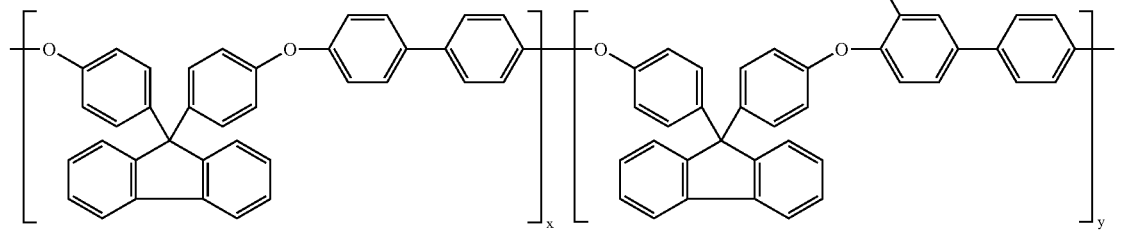

Procedure

Prior to conducting the grafting reaction with PAE-2, the PAE-2 is dissolved in THF then precipitated in methanol. Afterwards, the cleaned-up PAE-2 is dried in a vacuum oven (ca.120° C.) overnight in order to remove residual solvent.

Glassware used for the grafting reaction is pre-baked in a 140° C. oven and assembled while hot, which includes charging the reaction vessel with hot PAE-2.

In a 2 L, three-necked, round-bottomed flask, 26.60 g of PAE-2 (0.532 mol of polymer repeat unit) with Mw=35699, Mn=10764, and polydispersity=3.30 are dissolved in 600 mL of dry THF with mechanical stirring and under a nitrogen blanket. The solution is then cooled to −40° C. with the aid of a dry ice/acetone (or methanol) bath. With mechanical stirring, 50 mL of tert-butyllithium (1.7 M in pentane, 0.085 mol) are added to the polymer solution over 10–15 min. After addition, the cooling bath is removed and the solution is allowed to gradually warm to −20° C. with continued stirring. A 55.00 g portion of dodecyl/tetradecyl glycidyl ether (0.050 mol) dissolved in 200 mL of tetrahydrofuran is then added slowly via syringe over 5–10 min. with mechanical stirring. The mixture is then allowed to warm to room temperature with continued stirring.

After a minimum of 17 hr., a 10.00 g portion of glacial acetic acid (0.17 mol) is then added to the reaction mixture with continued mechanical stirring. After 3 hr., the reaction mixture is then poured into 2 L of methanol contained in a blender. The precipitated polymer is isolated via vacuum filtration and air dried overnight. The polymer is then dissolved in 500 mL of THF, the solution is filtered through Whatman #1 filter paper, and then the polymer solution is poured into 2 L of methanol contained in a blender.

The precipitated polymer is then collected via vacuum filtration and air dried as before. The polymer is then dried in a vacuum oven at 120° C. overnight. The weight of the dried polymer is determined. 28.50 g of dried polymer were obtained. The properties of the product included: NMR analysis, y value=0.75; Molecular Weight (via GPC analysis tetrahydrofuran solvent; against polystyrene standards), Mw=58,100; Mn=17,158; polydispersity=3.4; and Tg (via DSC)=165° C.

EXAMPLES 23–25

The procedure used in Example 22 is used except that the amount of reagents used is varied according to Table 2.

TABLE 2

Preparations of dodecyl/tetradecyl glycidyl ether grafted PAE-2

| Example | Polymer | Polymer Molecular Weight Properties | Graft Dodecyl/ Tetradecyl Glycidyl Ether Graft Mass (g) | T-Buli (Ml) | Y Value Via NMR | Tg(° C.) Second Heating | Isolated Polymer (g) | Grafted Polymer Molecular Weight Properties |
|---|---|---|---|---|---|---|---|---|
| 23 | PAE-2 | Mw = 18567, Mn = 8281, pd = 2.239 | 35.5 | 50 | 0.23 | 144.1 | 24 | Mw = 35523, Mn = 9448, pd = 3.8 |
| 24 | PAE-2 | Mw = 18567, Mn = 8281, pd = 2.239 | 28.46 | 60 | 0.38 | 138.98 | 28 | Mw = 36229, Mn = 9409, pd = 3.9 |
| 25 | PAE-2 | Mw = 104811, Mn = 12494, pd = 8.4 | 25 | 50 | 0.29 | 149.79 | 5.5 | Mw = 19728, Mn = 7461, pd = 2.6 |

EXAMPLE 26

Preparation of PAE-2 Grafted with Dodecyl Aldehyde

PAE-2 is grafted with dodecyl aldehyde in accordance with the following equation:

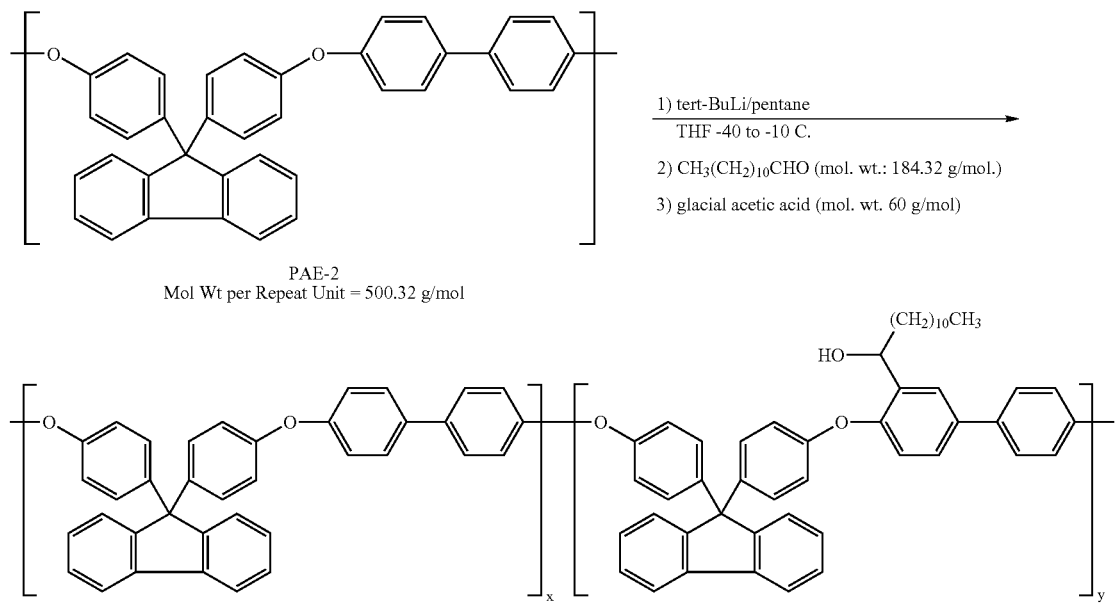

Procedure

Prior to conducting the grafting reaction with PAE-2, the PAE-2 is dissolved in THF then precipitated in methanol. Afterwards, the cleaned-up PAE-2 is dried in a vacuum oven (ca.120° C.) overnight in order to remove residual solvent.

Glassware used for the grafting reaction is pre-baked in a 140° C. oven and assembled while hot, which includes charging the reaction vessel with hot PAE-2.

In a 2 L, three-necked, round-bottomed flask, 25.00 g of PAE-2 (0.532 mol of polymer repeat unit) with Mw=104811, Mn=12494, and polydispersity=8.4 are dissolved in 600 mL of dry THF with mechanical stirring and under a nitrogen blanket. The solution is then cooled to −40° C. with the aid of a dry ice/acetone (or methanol) bath. With mechanical stirring, 50 mL of tert-butyllithium (1.7 M in pentane, 0.085 mol) are added to the polymer solution over 10–15 min. After addition, the cooling bath is removed and the solution is allowed to gradually warm to −20° C. with continued stirring. A 16.22 g portion of dodecyl aldehyde (0.088 mol) is then added slowly via syringe over 5–10 min. with mechanical stirring. The mixture is then allowed to warm to room temperature with continued stirring.

After a minimum of 17 hr., a 10.00 g portion of glacial acetic acid (0.17 mol) is then added to the reaction mixture with continued mechanical stirring. After 3 hr., the reaction mixture is then poured into 2 L of methanol contained in a blender. The precipitated polymer is isolated via vacuum filtration and air dried overnight. The polymer is then dissolved in 500 mL of THF, the solution is filtered through Whatman #1 filter paper, and then the polymer solution is poured into 2 L of methanol contained in a blender.

The precipitated polymer is then collected via vacuum filtration and air dried as before. The polymer is then dried in a vacuum oven at 120° C. overnight. The weight of the dried polymer is determined. 11.00 g of dried polymer were obtained. The properties of the product included: NMR analysis, y value=0.75; Molecular Weight (via GPC analysis tetrahydrofuran solvent; against polystyrene standards), Mw=51,886; Mn=15,802; polydispersity=3.3; and Tg (via DSC)=122° C.

EXAMPLES 27–28

The procedure used in Example 26 is used except that the amount of reagents used is varied according to Table 3.

TABLE 3

Preparations of dodecyl aldehyde grafted PAE-2

| Example | PAE-2 Mass Molecular Weight Properties | Dodecyl Aldehyde Mass (g) | T-Buli (Ml) | Y Value Via NMR | Tg(° C.) Second Heating | Isolated Polymer (g) | Grafted Polymer Molecular Weight Properties |
|---|---|---|---|---|---|---|---|
| 27 | 25 grams Mw = 29773, | 16.22 | 50 | 0.88 | 127.98 | 8.5 | Mw = 45235, Mn = 12068, |

TABLE 3-continued

Preparations of dodecyl aldehyde grafted PAE-2

| Example | PAE-2 Mass Molecular Weight Properties | Dodecyl Aldehyde Mass (g) | T-Buli (Ml) | Y Value Via NMR | Tg(° C.) Second Heating | Isolated Polymer (g) | Grafted Polymer Molecular Weight Properties |
|---|---|---|---|---|---|---|---|
| 28 | Mn = 9504, pd = 3.133 25 grams Mw = 104811, Mn = 12494, pd = 8.4 | 16.22 | 50 | 0.76 | 132.34 | 10 | pd = 3.7 Mw = 174670, Mn = 16420, pd = 10.6 |

EXAMPLE 29

Preparation of PAE-2 Grafted with 3,5,5-trimethylhexanal

PAE-2 is grafted with 3,5,5-trimethylhexanal in accordance with the following equation:

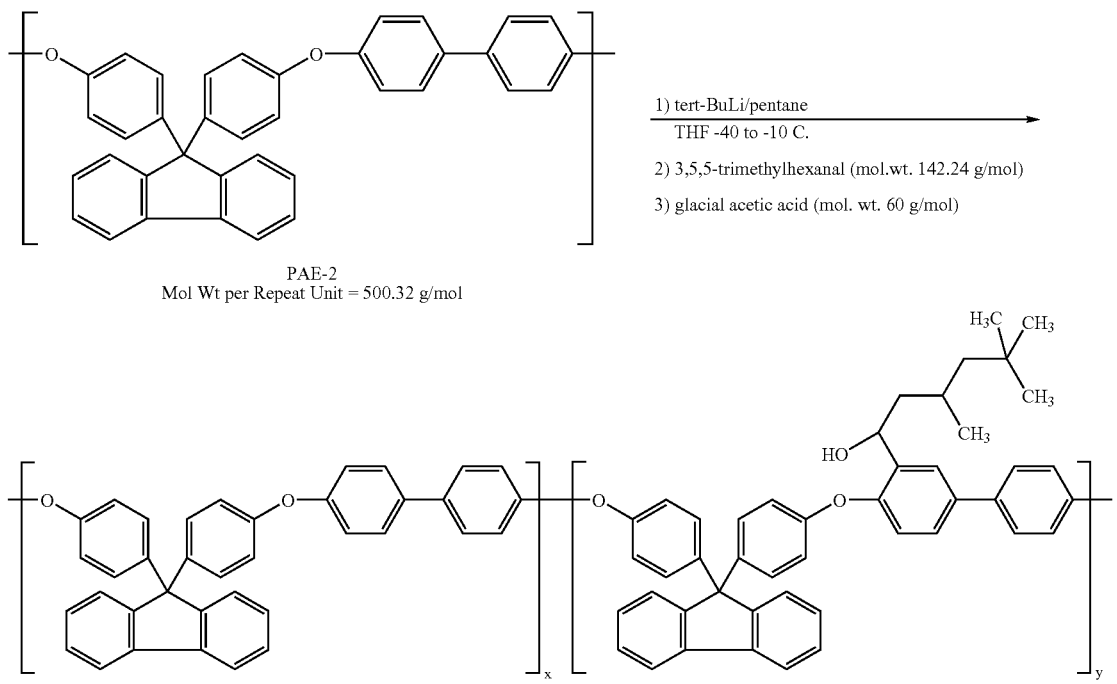

Procedure

Prior to conducting the grafting reaction with PAE-2, the PAE-2 is dissolved in THF then precipitated in methanol. Afterwards, the cleaned-up PAE-2 is dried in a vacuum oven (ca.120° C.) overnight in order to remove residual solvent.

Glassware used for the grafting reaction is pre-baked in a 140° C. oven and assembled while hot, which includes charging the reaction vessel with hot PAE-2.

In a 2 L, three-necked, round-bottomed flask, 25.00 g of PAE-2 (0.500 mol of polymer repeat unit) with Mw=104,811, Mn=12494, and polydispersity=8.4 are dissolved in 600 mL of dry THF with mechanical stirring and under a nitrogen blanket. The solution is then cooled to −40° C. with the aid of a dry ice/acetone (or methanol) bath. With mechanical stirring, 50 mL of tert-butyllithium (1.7 M in pentane, 0.085 mol) are added to the polymer solution over 10–15 min. After addition, the cooling bath is removed and the solution is allowed to gradually warm to −20° C. with continued stirring. A 12.5 g portion of 3,5,5-trimethylhexanal (0.088 mol) is then added slowly via syringe over 5–10 min. with mechanical stirring. The mixture is then allowed to warm to room temperature with continued stirring.

After a minimum of 17 hr., a 10.00 g portion of glacial acetic acid (0.17 mol) is then added to the reaction mixture with continued mechanical stirring. After 3 hr., the reaction mixture is then poured into 2 L of methanol contained in a blender. The precipitated polymer is isolated via vacuum filtration and air dried overnight. The polymer is then dissolved in 500 mL of THF, the solution is filtered through Whatman #1 filter paper, and then the polymer solution is poured into 2 L of methanol contained in a blender.

The precipitated polymer is then collected via vacuum filtration and air dried as before. The polymer is then dried in a vacuum oven at 120° C. overnight. The weight of the dried polymer is determined. 20.00 g of dried polymer were obtained. The properties of the product included: NMR analysis, y value=1.03; Molecular Weight (via GPC analysis tetrahydrofuran solvent; against polystyrene standards), Mw=184567; Mn=18523; polydispersity=10.0; and Tg (via DSC)=193° C.

EXAMPLE 30

The procedure used in Example 29 is used except that the amount of 3,5,5-trimethylhexanal is 18.00 g (0.126 mol). The starting PAE-2 had the following properties: Mw=18567; Mn=8281; and polydispersity=2.239. The isolated grafted PAE-2 (mass isolated=26 g) had the following properties: Mw=35501; Mn=12010; polydispersity=3.0; and Tg=191.

EXAMPLE 31

Preparation of PAE-2 with Grafted 2-Ethylhexanal

PAE-2 is grafted with 2-ethylhexanal in accordance with the following equation:

In a 1 L, three-necked, round-bottomed flask, 25.00 g of PAE-2 (0.500 mol of polymer repeat unit) with Mw=18567, Mn=8291, and polydispersity=2.239 were dissolved in 600 ml of dry THF with mechanical stirring and under a nitrogen blanket. The solution is then cooled to −40° C. with the aid of a dry ice/acetone (or methanol) bath. With mechanical stirring, 50 mL of tert-butyllithium (1.7 M in pentane, 0.086 mol) are added to the polymer solution over 10–15 min. After addition, the cooling bath is removed and the solution is allowed to gradually warm to −10° C. with continued stirring. A 20.0 g portion of 2-ethylhexanal (0.156 mol) is then added slowly over 5–10 min. with mechanical stirring. The mixture is then allowed to warm to room temperature with continued stirring.

After a minimum of 17 hr., a 10.00 g portion of glacial acetic acid (0.167 mol) is then added to the reaction mixture with continued mechanical stirring. After 3 hr., the reaction mixture is then is filtered through Whatman #1 filter paper, then precipitated by pouring into 2 L of methanol contained in a blender. The precipitated polymer is isolated via vacuum filtration and dried in a vacuum oven (80° C. overnight). The weight of the dried polymer was 26.0 g. The properties of the product included: NMR analysis, y value=1.19; Molecular Weight (via GPC analysis tetrahydrofuran solvent; against

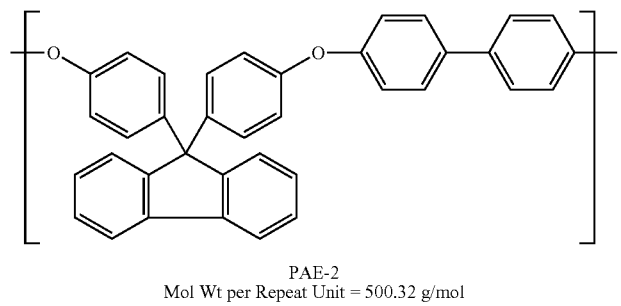

PAE-2
Mol Wt per Repeat Unit = 500.32 g/mol 1) tert-btyllithium
   THF -40 to -10 C.

2) 2-ethylhexanal (mol. wt. 128.22)

3) glacial acetic acid

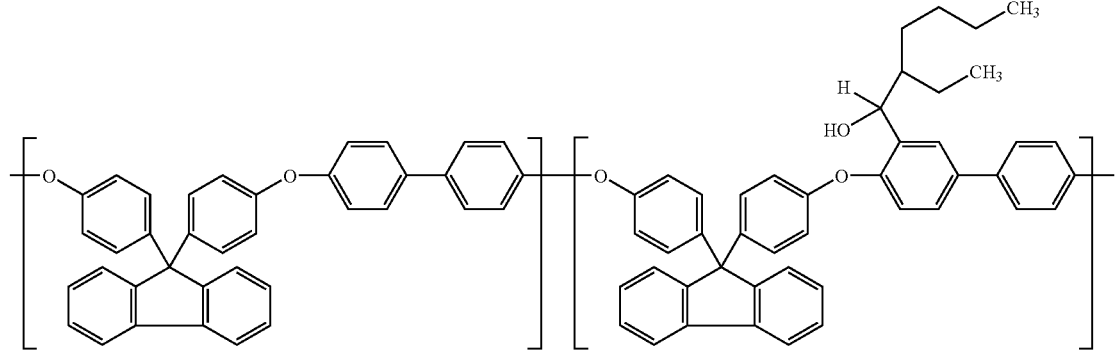

Procedure

Prior to grafting reaction with PAE-2, the PAE-2 is dissolved in THF and then precipitated in methanol. Afterwards, the cleaned-up PAE-2 is dried in a vacuum oven (ca.120° C.) overnight in order to remove residual solvent.

Glassware used for the grafting reaction is pre-baked in a 140° C. oven and assembled while hot, which includes charging the reaction vessel with hot PAE-2.

polystyrene standards), Mw=36892; Mn=13471; polydispersity=2.739; and Tg (via DSC)=176° C.

EXAMPLES 32–33

The procedure used in Example 31 is used except that the amount of reagents is varied according to the Table 4.

TABLE 4

Preparations of 2-ethylhexanal grafted PAE-2

| Example | PAE-2 mass polymer molecular weight properties | 2-ethylhexanal mass (gm) | t-BuLi (ml) | Y value via NMR | Tg (° C.) second heating | isolated polymer (gm) | grafted polymer molecular weight properties |
|---|---|---|---|---|---|---|---|
| 32 | 25 g<br>Mw = 104811,<br>Mn = 12494,<br>pd = 8.4 | 20 | 50 | 0.97 | 185.06 | 24 | Mw = 266912,<br>Mn = 21739,<br>pd = 12.3 |
| 33 | 25 g<br>Mw = 18567,<br>Mn = 8291,<br>pd = 2.239 | 30 | 75 | 1.39 | 158.89 | 10 | Mw = 47574,<br>Mn = 15054,<br>pd = 3.2 |

EXAMPLE 34

Preparation of PAE-2 with Grafted 5-Methyl-2-hexanone

PAE-2 is grafted with 5-methyl-2-hexanone in accordance with the following equation:

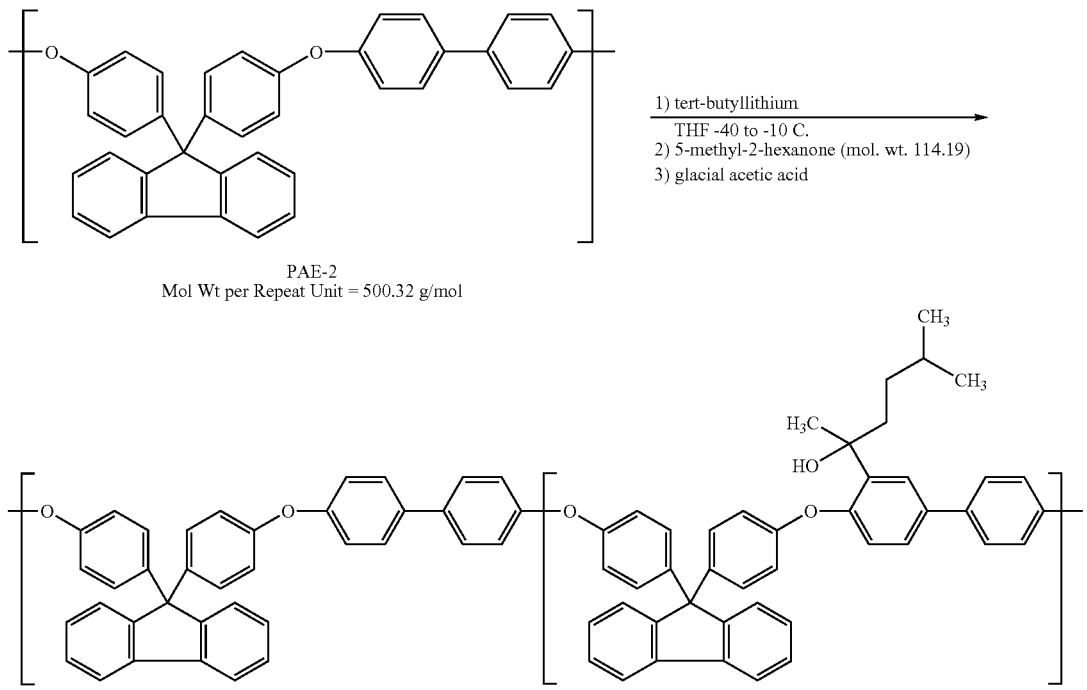

PAE-2
Mol Wt per Repeat Unit = 500.32 g/mol 1) tert-butyllithium
   THF -40 to -10 C.
2) 5-methyl-2-hexanone (mol. wt. 114.19)
3) glacial acetic acid Procedure Prior to grafting reaction with PAE-2, the PAE-2 is dissolved in THF then precipitated in methanol. Afterwards, the cleaned-up PAE-2 is dried in a vacuum oven (ca. 120° C.) overnight in order to remove residual solvent.

Glassware used for the grafting reaction is pre-baked in a 140° C. oven and assembled while hot, which includes charging the reaction vessel with hot PAE-2.

In a 1 L, three-necked, round-bottomed flask, 25.00 g of PAE-2 (0.50 mol of polymer repeat unit) are dissolved in 600 mL of dry THF with mechanical stirring and under a nitrogen blanket. The solution is then cooled to −40° C. with the aid of a dry ice/acetone (or methanol) bath. With mechanical stirring, 50 mL of tert-butyllithium (1.7 M in pentane, 0.086 mol) are added to the polymer solution over 10–15 min. After addition, the cooling bath is removed and the solution is allowed to gradually warm to −10° C. with continued stirring. A 11.42 g portion of 5-methyl-2-hex-anone (0.100 mol) is then added slowly over 5–10 min. with mechanical stirring. The mixture is then allowed to warm to room temperature with continued stirring.

After a minimum of 17 hr., a 10.00 g portion of glacial acetic acid (0.167 mol) is then added to the reaction mixture with continued mechanical stirring. After 3 hr., the reaction mixture is then is filtered through Whatman #1 filter paper, then precipitated by pouring into 2 L of methanol contained in a blender. The precipitated polymer is isolated via vacuum filtration and dried in a vacuum oven (80° C. overnight). The weight of the dried polymer was 25.0 g. The properties of the product included: NMR analysis, y value=0.90; Molecular Weight (via GPC analysis tetrahydrofuran solvent; against polystyrene standards), Mw=156820; Mn=20041; polydispersity=7.8; and Tg (via DSC)=212° C.

EXAMPLE 35

Preparation of Isotropically Conductive Adhesive (ICA) Using PAE-2 with Undecanone Graft PAE-2 with undecanone graft is the polymer component of a series of thermoplastic isotropically conductive adhesives (ICA), which are being investigated for commercial application as a replacement to solder, such as e.g., tin/lead solder and lead-free solder. The general procedure for the preparation of ICA is to dissolve PAE-2 with undecanone graft in cyclohexanone (solvent) and then to add the additives to the mixture. Finally, silver flakes are added to provide conductivity to those ICA formulations.

Procedure

Figure 2:
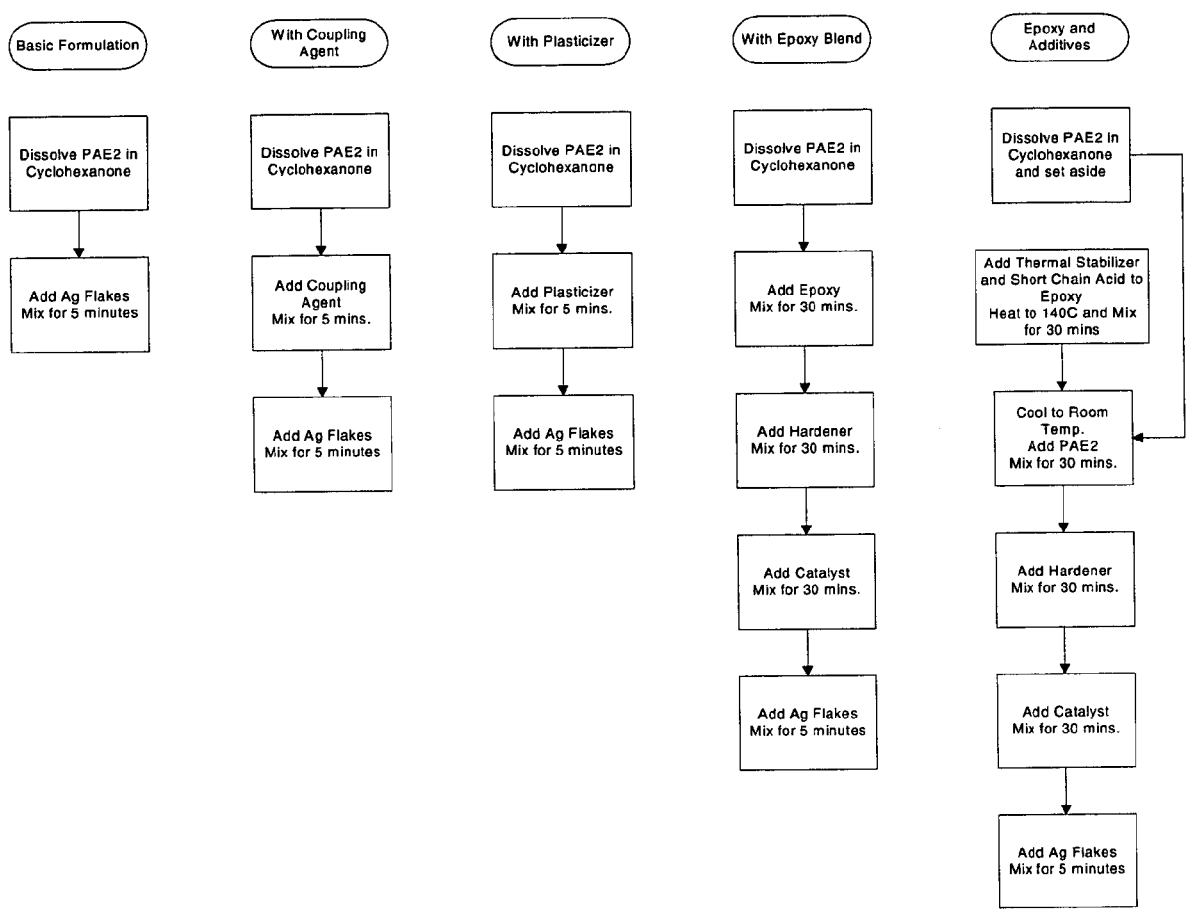
FIG. 2 is a process flow chart of ICA formulations.

The procedure for ICA preparation, based on this invention, can be divided into five different types, according to the additives in the formulation. The five different types of formulations/procedures are:

Basic Formulation
Coupling Agent
Plasticizer
Epoxy Blend
Epoxy Blend and Additives Summaries of the five different procedures are shown in FIG. 2 and discussed in turn below.

Basic Formulation

PAE-2 with undecanone graft is dissolved in cyclohexanone at a concentration of 29 wt % polymer. The mixture is left to stand overnight to allow for complete dissolution of the polymer. Heat may be used to facilitate the dissolution, but solvent loss may take place. Silver flakes are added to the polymer-solvent solution and the mixture is stirred manually for approximately 5 minutes. The concentration of silver flakes is 80 wt %, based on the weight of polymer. There are two sizes of silver flakes used in the formulation: Fisher sub sieve sizer of 1.90–5.50 microns and 0.80–2.00 microns. The silver flakes of two different sizes are added in equal proportions.

The contact resistance of the composition was measured using a Keithley Multimeter equipped with a four-point probe. Test coupons were made from an FR-4 organic substrate having an etched pattern thereon. Gaps between adjacent pads on each coupon were filled with the test composition to make an electrical connection. The thickness of the stencil was 0.004". The ratio of the opening to feature size was designed at 1:1.

Probes were placed on the coupons. Contact resistance was measured on four different surface finishes: SnPb, Sn, CuOSP and NiAu. These four surface finishes represent the four most common surface finishes found on substrates.

The contact resistance stability in extreme conditions was highly dependent on the surface finish of the coupons. The contact resistance stability was monitored at conditions of elevated temperature and high humidity (85° C. and 85% relative humidity). An environmental chamber was used to create the extreme conditions. Four different surface finishes were used: SnPb, Sn, NiAu and CuOSP. The most stable behavior was observed on CuOSP. Adhesion strength was also measured. The best adhesion was observed on the CuOSP surface. Adhesion samples did not include the silver flakes.

Coupling Agent Formulation

PAE-2 with undecanone graft is completely dissolved in cyclohexanone at a concentration of 29 wt % polymer as described above. The coupling agent is added to the resulting solution. The mixture is stirred manually for 5 minutes. The concentration of coupling agent varied from 0.5wt % to 3.0 wt %, based on the weight of polymer. A list of the coupling agents tested is shown in Table 5. Silver flakes can be added as described in the procedure for Basic Formulation.

Improvement in adhesion strength is observed on all four surface finish types, but most significantly on NiAu surface. The increase in adhesion strength also correlated with improvement in contact resistance stability. Titanate-based coupling agents were found to be incompatible with PAE-2 with undecanone graft, but more positive results were observed for silane-based coupling agents. Adhesion improvement varied with the concentration of the coupling agents added to the formulation. Table 6 summarizes the results of adhesion improvement using coupling agents.

TABLE 5

List of Coupling Agents

| Coupling Agent | Chemical Structure | Name | Manufacturer |
|---|---|---|---|
| Lica 12 | (structure shown with CH$_2$=CH—CH$_2$O—CH$_2$ and CH$_2$CH$_2$—C—CH$_2$—O—Ti—O—P(=O)(OC$_8$H$_{17}$)$_2$ groups, with additional P(=O)(OC$_8$H$_{17}$)$_2$ substituents) | Neopentyl(diallyl)oxy-tri(dioctyl)phosphato titanate | KenReact Petrochemicals |

TABLE 5-continued

List of Coupling Agents

| Coupling Agent | Chemical Structure | Name | Manufacturer |
|---|---|---|---|
| KRTTS | $CH_3-CH(CH_3)-O-Ti(-O-C(=O)-C_{17}H_{25})_3$ | Isopropyl triisostearoyl titanate | KenReact Petrochemicals |
| A186 | (epoxycyclohexyl)ethyl-Si(OMe)$_3$ | β-(3,4-epoxycyclohexyl)-ethyltrimethoxysilane | Silquest |
| A187 | (MeO)$_3$Si-CH$_2$CH$_2$CH$_2$-O-CH$_2$-(epoxide) | γ-glycidoxypropyl trimethoxysilane | Silquest |
| A1120 | H$_2$NCH$_2$CH$_2$NH-CH$_2$-CH$_2$CH$_2$Si(OMe)$_3$ | N-(2-aminoethyl)-3-aminopropyl trimethoxysilane | Silquest |
| A1102 | H$_2$NCH$_2$CH$_2$CH$_2$Si(OEt)$_2$ | γ-aminopropyl triethoxysilane | Silquest |
| Y9669 | C$_6$H$_5$-NH-CH$_2$-CH$_2$CH$_2$Si(OMe)$_3$ | N-phenylaminopropyl trimethoxysilane | Silquest |
| I7810 | (CH$_3$)$_2$CH-CH$_2$Si(OMe)$_3$ | Isobutyl trimethoxysilane | Silquest |

TABLE 6

Summary of Adhesion And Contact Resistance Results

| Coupling Agent | Adhesion Improved? | | | | Contact Resistance Stability Improved? | | | |
|---|---|---|---|---|---|---|---|---|
| | SnPb | Sn | CuOSP | NiAu | SnPb | Sn | CuOSP | NiAu |
| Lica 12 | Not Tested | Not Tested | Not Tested | Not Tested | No | No | No | No |
| KRTTS | Not Tested | Not Tested | Not Tested | Not Tested | No | No | No | No |
| A186 | No | Yes | No | Yes | Yes | Yes | No Change | Yes |
| A187 | No | Yes | No | Yes (4.0 wt %) | Yes | Yes | No Change | Yes |
| A1120 | No | No | No | Yes (1.0 wt %) | Yes | Yes | No Change | Yes |

TABLE 6-continued

Summary of Adhesion And Contact Resistance Results

| Coupling Agent | Adhesion Improved? | | | | Contact Resistance Stability Improved? | | | |
|---|---|---|---|---|---|---|---|---|
| | SnPb | Sn | CuOSP | NiAu | SnPb | Sn | CuOSP | NiAu |
| A1102 | Not Tested | Not Tested | Not Tested | Not Tested | Yes | Yes | No Change | Yes |
| Y9669 | Yes | No | No | Yes | Not Tested | Not Tested | Not Tested | Not Tested |
| I7810 | No | No | No | No | Not Tested | Not Tested | Not Tested | Not Tested |

Plasticizer Formulation

PAE-2 with undecanone graft is completely dissolved in cyclohexanone at a concentration of 29 wt % polymer as described above. The plasticizer is added to the resulting solution. The concentration of plasticizer varied from 2 wt % to 20 wt %, based on the weight of polymer. Silver flakes can be added as described in the procedure for Basic Formulation.

Figure 3:
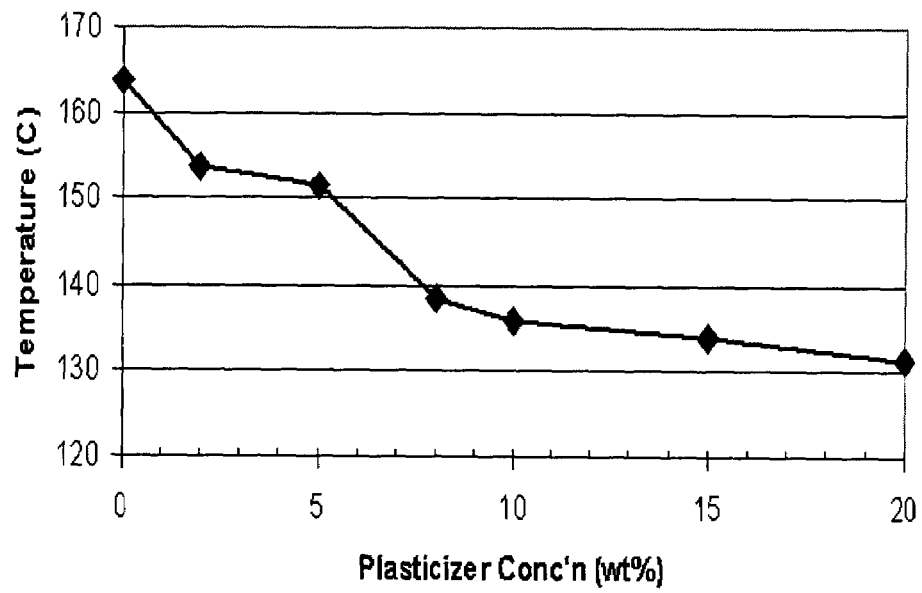
FIG. 3 is a plot of Tg (° C.) vs. plasticizer concentration.
Figure 4:
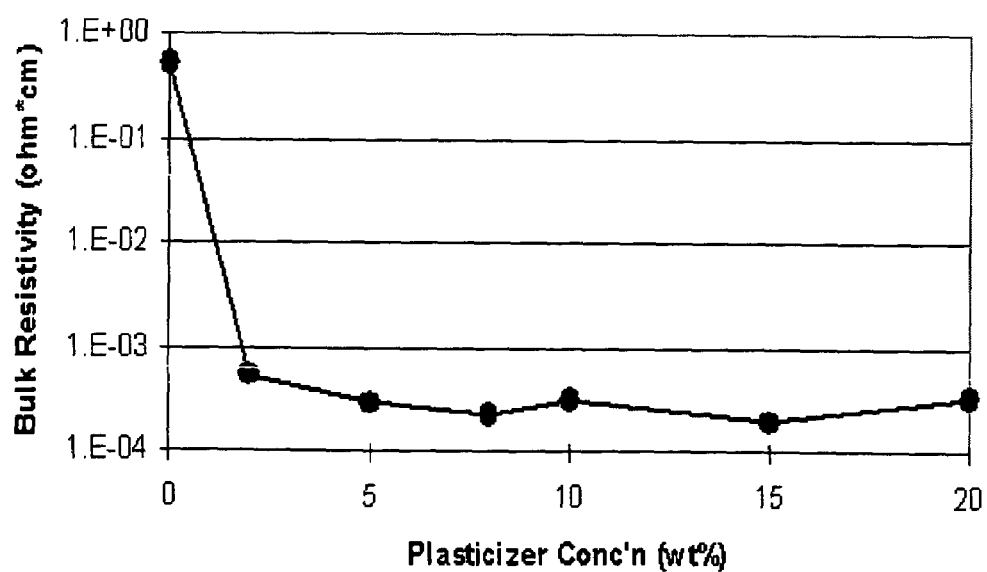
FIG. 4 is a plot of bulk resistivity vs. plasticizer concentration.

The plasticizer lowers the Tg of the polymer and allows for cyclohexanone to evaporate from the polymer network more efficiently. A chart showing the change in Tg with plasticizer concentration is shown in FIG. 3. Consequently, the bulk resistivity of ICA with plasticizer decreased as a function of the addition of plasticizer in the formulation. The results are shown in FIG. 4.

Epoxy Blend Formulation

PAE-2 with undecanone graft is completely dissolved in cyclohexanone at a concentration of 29 wt % polymer as described above. Epoxy resin is added to the solution and mixed for 30 minutes. A hardener is then added to the mixture and mixed for another 30 minutes. A curing catalyst is added and the resulting mixture is mixed for 30 minutes again. As the last step, silver flakes can be added as described in the procedure for Basic Formulation.

Figure 5:
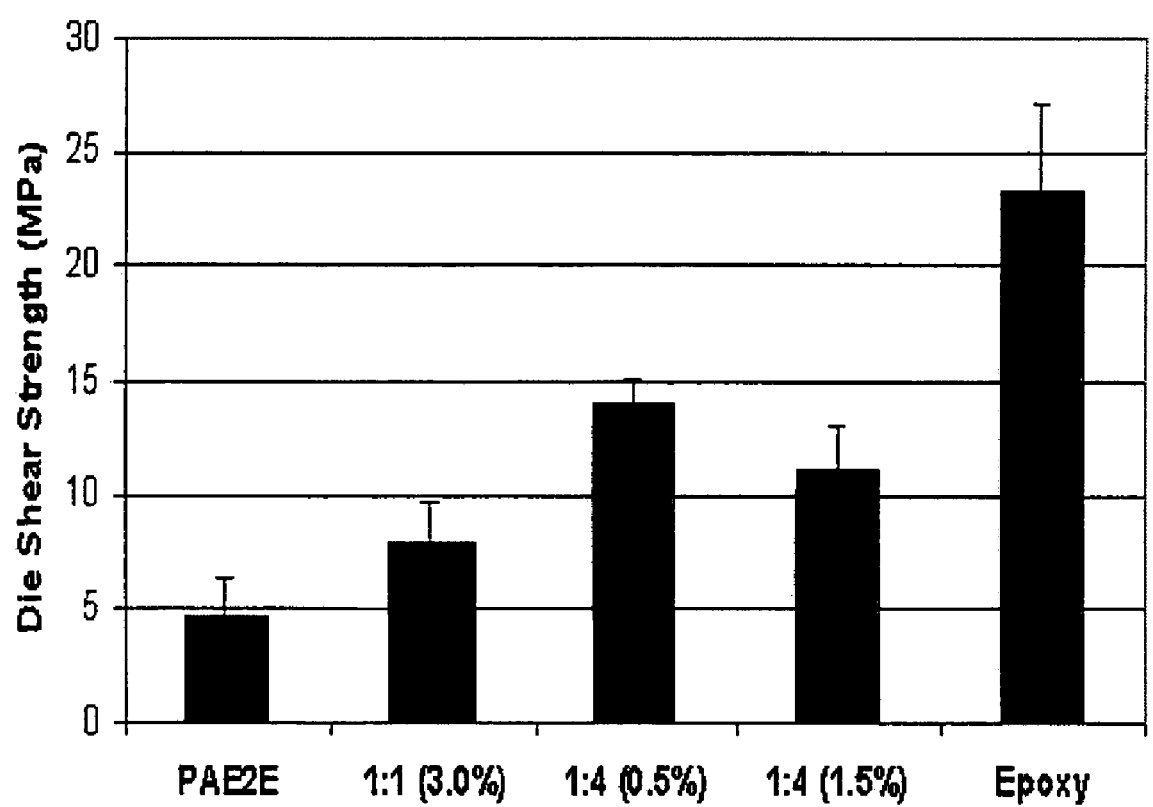
FIG. 5 is a plot of die shear strength (MPa) as a function of PAE2/epoxy composition.

Table 7 shows the result of contact resistance stability for various ICA formulations with epoxy blends. FIG. 5 shows the adhesion improvement observed with the epoxy blends.

TABLE 7

Summary of Epoxy Blend Contact Resistance Results

| PAE-2 with Undecanone Part | Epoxy Part | Catalyst Conc'n (wt %) | SnPb | Sn | CuOSP | NiAu |
|---|---|---|---|---|---|---|
| 1 | 1 | 3.0 | Failed | Failed | Passed | Passed |
| 1 | 4 | 0.5 | Failed | Failed | Failed | Failed |
| 1 | 4 | 1.5 | Failed | Failed | Failed | Failed |
| 1 | 4 | 3.0 | Failed | Failed | Failed | Passed |
| 4 | 1 | 3.0 | Failed | Failed | Failed | Passed |

Epoxy Blend with Additives Formulation

Thermal stabilizers and a short chain acid are added into the epoxy and heated to 140° C. and allowed to mix for 30 minutes. The solution is left to cool to room temperature and then mixed with PAE-2 with undecanone graft dissolved in cyclohexanone. The epoxy and PAE-2 mixture are mixed for 30 minutes. Hardener is then added, followed by mixing for another 30 minutes. The catalyst is added and then mixed for another 30 minutes. Finally, silver flakes are added as described in the Basic Formulation procedure.

By blending epoxy into the ICA formulation, the moisture uptake increases. This causes the contact resistance stability to degrade from the formation of metal oxides during galvanic corrosion. The addition of thermal stabilizers and short chain acid helps to stabilize the contact resistance stability and to reduce the bulk resistivity, respectively. Thermal stabilizers such as pyridine, imidazole and/or diphenylsulfoxide can be used.

A list of the ICA formulations made from PAE-2 with undecanone graft is shown in Table 8. The additives, experiments, and summary of results are also listed in the table.

TABLE 8

ICA Formulations Based on PAE-2 with Undecanone Graft

| ICA No. | Cyclohexanone Concentration (wt %) | Additive | Experiment | Results |
|---|---|---|---|---|
| 1 | 71 | — | Contact Resistance Bulk Resistivity Adhesion | Contact resistance on CuOSP surface was most stable. Adhesion strength greatest on CuOSP surface. |
| 2 | 71 | Coupling Agent | Adhesion Contact Resistance | Adhesion and stability of contact resistance improved with use of coupling agent |
| 3 | 71 | — | TGA | Optimum drying process was a 3-step program. 30 minutes at 100° C., 150° C., and 200° C. |

TABLE 8-continued

ICA Formulations Based on PAE-2 with Undecanone Graft

| ICA No. | Cyclohexanone Concentration (wt %) | Additive | Experiment | Results |
|---|---|---|---|---|
| 4 | 71 | Coupling Agent | Adhesion Contact Resistance | Adhesion and stability of contact resistance improved with use of coupling agent |
| 5 | 71 | Plasticizer | Adhesion Contact Resistance Bulk Resistivity Moisture Absorption TGA DSC | Tg of polymer decreased with plasticizer and consequently the bulk resistivity decreased. Moisture absorption increased and caused contact resistance to be less stable. |
| 6 | 71 | Epoxy | DSC Adhesion Contact Resistance Bulk Resistivity Moisture Absorption | Bulk resistivity decreased and adhesion increased. Contact resistance less stable due to corrosion. |
| 7 | 71 | Epoxy Thermal Stabilizer Short Chain Acid | DSC Adhesion Contact Resistance Bulk Resistivity Moisture Absorption | Addition of corrosion inhibitor and short chain acid helped stabilize the contact resistance |
| 8 | 71 | Coupling Agent | Adhesion Contact Resistance | Adhesion and stability of contact resistance improved with use of coupling agent |

While the invention has been described in detail and with reference to specific examples thereof, it will be apparent to one skilled in the art that various changes and modifications can be made therein without departing from the spirit and scope thereof.

The invention claimed is:

1. A poly(arylene ether) polymer including polymer repeat units of the following structure:

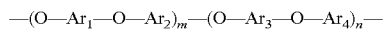

where $Ar_1$, $Ar_2$, $Ar_3$, and $Ar_4$ are identical or different aryl radicals, m is 0.05 to 0.95, n is 1-m, and at least one of the aryl radicals is grafted to at least one hydroxyalkyl group.

2. The polymer of claim 1, wherein one of the aryl radicals of the polymer repeat units is grafted to one hydroxyalkyl group.

3. The polymer of claim 1, wherein at least one of the aryl radicals of the polymer repeat units is grafted to more than one hydroxyalkyl group.

4. The polymer of claim 1, wherein the polymer repeat units have the following structure:

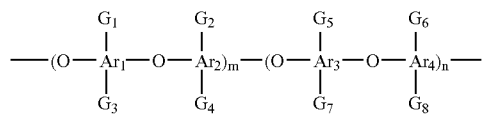

where $G_1$, $G_2$, $G_3$, $G_4$, $G_5$, $G_6$, $G_7$ and $G_8$ are identical or different species of the at least one hydroxyalkyl group.

5. The polymer of claim 1, wherein an average number of hydroxyalkyl groups per polymer repeat unit is 0.01 to 8.0.

6. The polymer of claim 5, wherein the average number of hydroxyalkyl groups per polymer repeat unit is 0.01 to 4.0.

7. The polymer of claim 5, wherein the average number of hydroxyalkyl groups per polymer repeat unit is 0.25 to 1.0.

8. The polymer of claim 5, wherein the at least one hydroxyalkyl group is selected from the group consisting of:

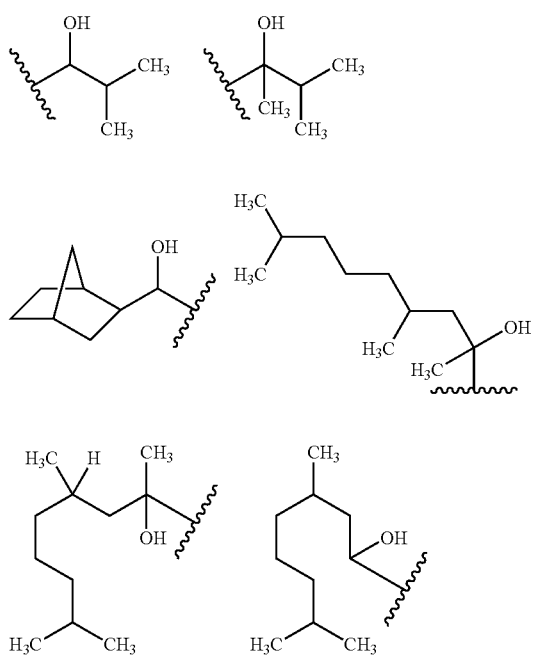

-continued

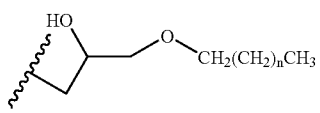
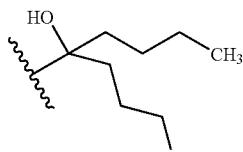
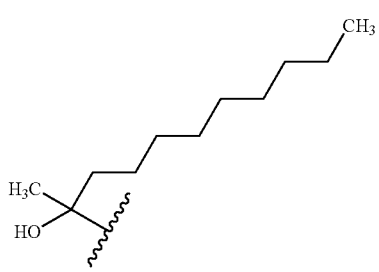
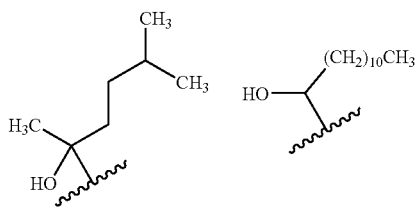
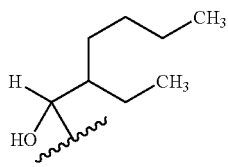 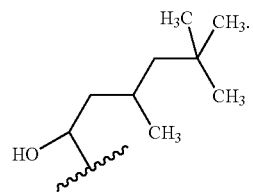

9. The polymer of claim 5, wherein the at least one hydroxyalkyl group is 2-undecanol.

10. The polymer of claim 5, wherein the aryl radicals are independently selected from the group consisting of:

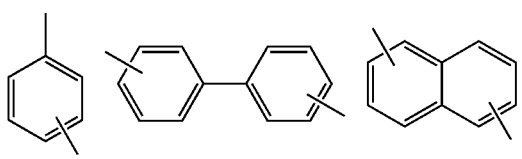
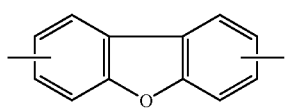

-continued

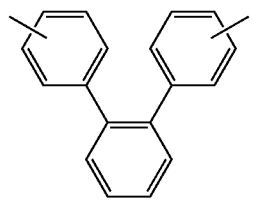
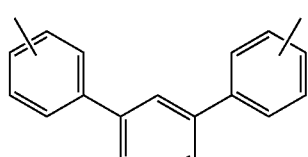
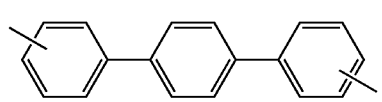
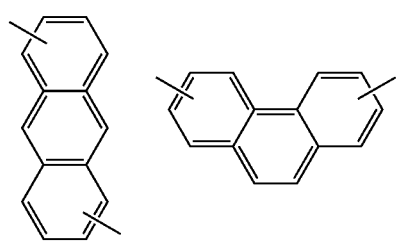
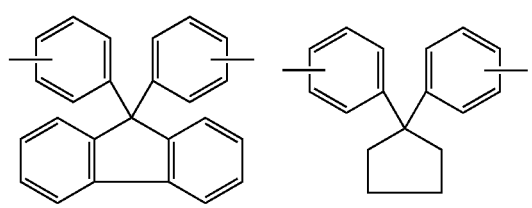
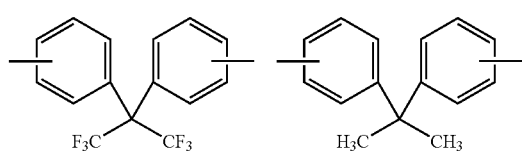
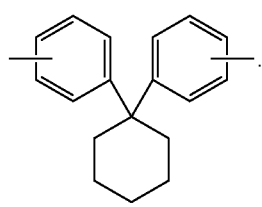

11. The polymer of claim 5, wherein at least one of the aryl radicals is selected from the group consisting of 9,9-bis(4-hydroxyphenyl)-fluorene, 2,2-diphenylhexafluoropropene and 2,2-diphenylpropene.

12. The polymer of claim 5, wherein the polymer repeat units are independently selected from the group consisting of:

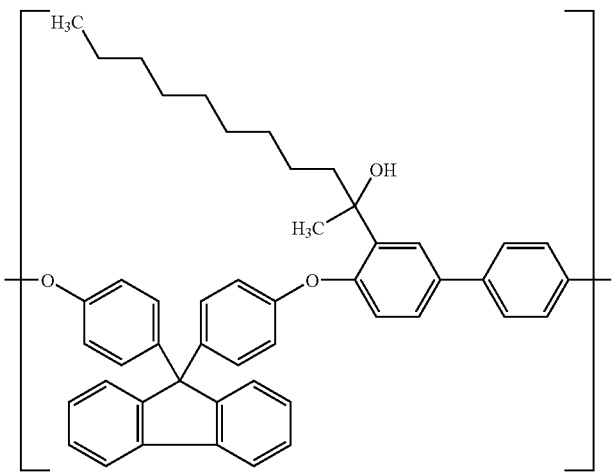
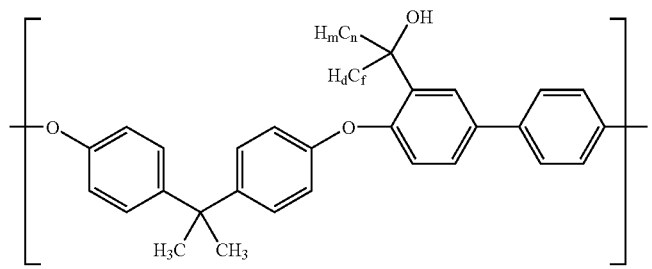
Where d, f m, and n are integers and
m = 4n + 1 and d = 4f + 1
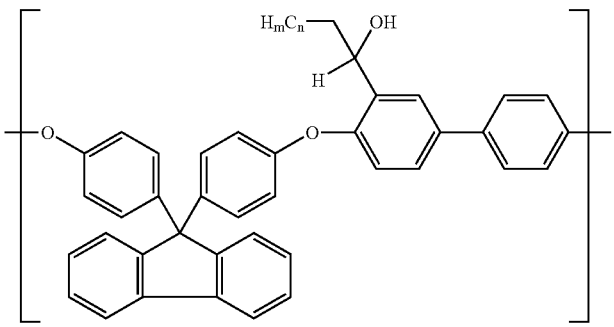
Where m and n are integers and
m = 4n + 1
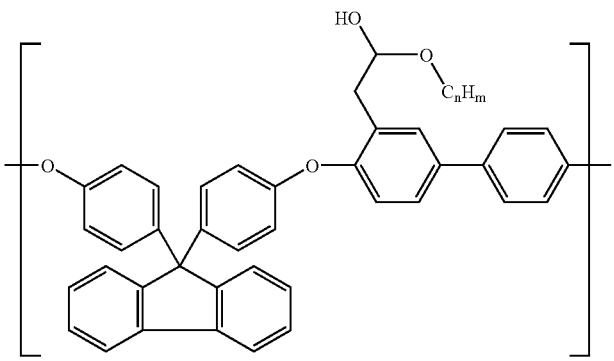
Where m and n are integers and
m = 4n + 1

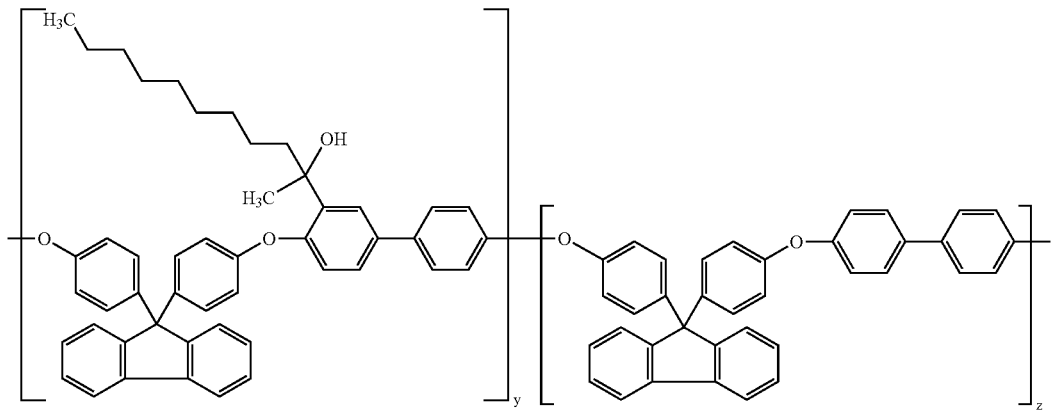

where y + z = 1 and y > 0.01

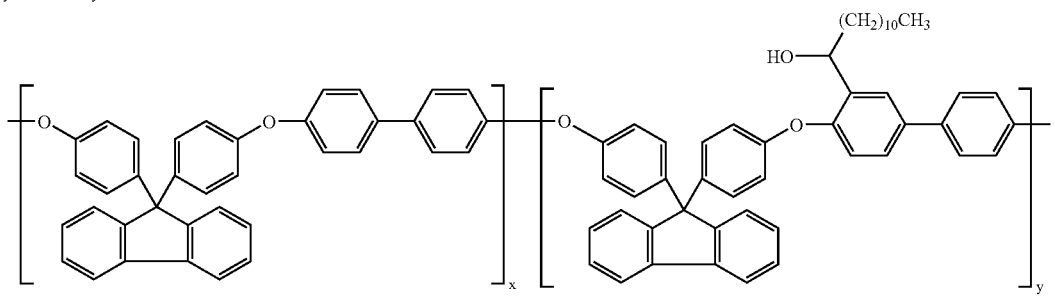

where x + y = 1.0 and y > 0.01

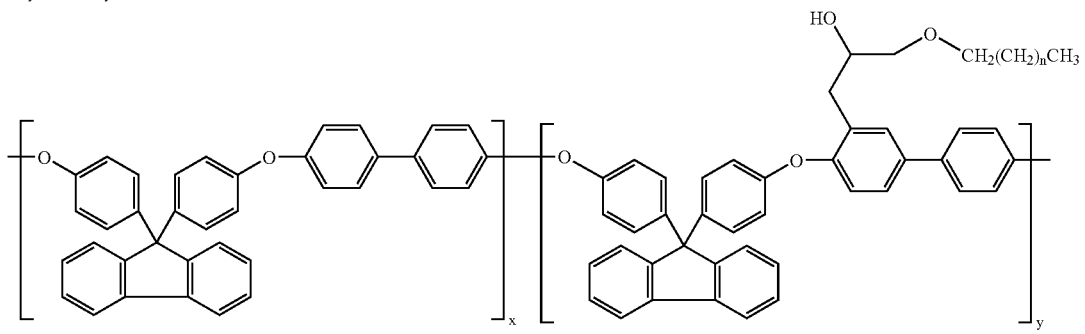

where x + y = 1.0 and y > 0.01.

13. The polymer of claim 5 in an electrically conductive adhesive.

14. The polymer of claim 13 in an integrated circuit.

15. A composition comprising the polymer of claim 1.

16. The composition of claim 15, further comprising a sufficient amount of conductive particles to render the composition suitable for use as an electrically conductive adhesive.

17. The composition of claim 16, wherein the electrically conductive particles comprise at least one metal selected from the group consisting of copper, silver, nickel, gold, platinum and tin-bismuth alloy.

18. The composition of claim 17, wherein each of the electrically conductive particles has a diameter less than 100 nm.

19. The composition of claim 16, wherein the electrically conductive particles comprise carbon nanotubes and carbon black.

20. The composition of claim 16, further comprising an adhesion promoter.

21. The composition of claim 16, further comprising a plasticizer.

22. The composition of claim 16, further comprising a chelating agent.

23. The composition of claim 16, further comprising an epoxy resin system.

24. The composition of claim 1, wherein the at least one hydroxyalkyl group is derived from an aliphatic aldehyde, an aliphatic ketone or an aliphatic glycidyl ether.

25. An adhesion method comprising applying the composition of claim 16 between a first substrate and a second substrate to adhere the first substrate to the second substrate.

26. An electronic package comprising the polymer of claim 1.

27. The electronic package of claim 26, wherein the polymer is contained in a thermally conductive adhesive.

28. The electronic package of claim 26, wherein the polymer is contained in a die attach adhesive.

29. The electronic package of claim 26, wherein the polymer is contained in an encapsulant.

* * * * *